(12) United States Patent
Kinoshita et al.

(10) Patent No.: US 9,286,480 B2
(45) Date of Patent: Mar. 15, 2016

(54) INFORMATION PROCESSING DEVICE, NON-TRANSITORY COMPUTER READABLE MEDIUM, AND INFORMATION PROCESSING METHOD

(71) Applicant: FUJI XEROX CO., LTD., Minato-ku, Tokyo (JP)

(72) Inventors: Yosuke Kinoshita, Kanagawa (JP); Kohshiro Inomata, Kanagawa (JP); Fumihisa Suzuki, Kanagawa (JP); Hirochika Shionoiri, Kanagawa (JP); Yasushi Amano, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/310,686

(22) Filed: Jun. 20, 2014

(65) Prior Publication Data

US 2015/0121542 A1 Apr. 30, 2015

(30) Foreign Application Priority Data

Oct. 25, 2013 (JP) ................................. 2013-222240

(51) Int. Cl.
*G06F 7/04* (2006.01)
*G06F 17/30* (2006.01)
*H04N 7/16* (2011.01)
*G06F 21/60* (2013.01)

(52) U.S. Cl.
CPC ...... *G06F 21/608* (2013.01); *G06F 2221/2113* (2013.01)

(58) Field of Classification Search
CPC ..... G06F 21/6218; G06F 21/10; G06F 21/60; G06F 21/62; G06F 21/6245
USPC .......................................................... 726/27
See application file for complete search history.

(56) References Cited

U.S. PATENT DOCUMENTS

| 2006/0047659 | A1* | 3/2006 | Yagiura .............................. 707/9 |
| 2008/0266467 | A1 | 10/2008 | Okamoto et al. |
| 2010/0218259 | A1* | 8/2010 | Mishina et al. ................. 726/26 |
| 2012/0166442 | A1* | 6/2012 | Furuichi et al. ............... 707/740 |

FOREIGN PATENT DOCUMENTS

| JP | 2007-087390 A | 4/2007 |
| JP | 2007-158965 A | 6/2007 |
| JP | 2008-277978 A | 11/2008 |
| JP | 2010-224947 A | 10/2010 |

* cited by examiner

*Primary Examiner* — Kambiz Zand
*Assistant Examiner* — Stephen Sanders
(74) *Attorney, Agent, or Firm* — Sughrue Mion, PLLC (57) ABSTRACT

An information processing device includes a processing-type accepting unit that accepts a type of first processing of data, a data accepting unit that accepts post-processing data, the post-processing data being data on which the first processing accepted by the processing-type accepting unit has been executed, and a data processing unit that determines a data confidentiality level indicating a degree of confidentiality of the post-processing data, on a basis of a first confidentiality level associated with the type of the first processing, and executes second processing according to the data confidentiality level with respect to the post-processing data.

17 Claims, 10 Drawing Sheets

| DESCRIPTIONS OF PROCESSING | CONFIDENTIALITY LEVEL TO BE ADDED |
|---|---|
| ACQUISITION OF CERTIFICATE OF RESIDENCE | 5 |
| EXTRACTION OF PRE-DRIVING INSPECTION RECORD SHEET | 3 |
| OCR | 2 |
| TRANSLATION | 2 |

FIG. 4

| DETECTION RESULTS | CONFIDENTIALITY LEVEL TO BE ADDED |
|---|---|
| CHARACTERS "CONFIDENTIAL" OR "SECRET" EXIST IN PREDETERMINED AREA | 10 |
| CHARACTERS "HANDLE WITH CARE" EXIST IN PREDETERMINED AREA | 6 |
| TELEPHONE NUMBER, EMAIL ADDRESS | 4 |

FIG. 5

| FORM | CONFIDENTIALITY LEVEL TO BE ADDED |
|---|---|
| CERTIFICATE OF RESIDENCE FORM | 5 |
| PRE-DRIVING INSPECTION RECORD FORM | 3 |
| FORM A | 4 |
| . . . | 2 |
| . . . | 2 |

FIG. 6A

| SUPPLIER LIST | | | | |
|---|---|---|---|---|
| SUPPLIER'S ID | SUPPLIER'S NAME | REPRESENTATIVE'S NAME | REPRESENTATIVE'S JOB TITLE | ZIP CODE | ... |
| | | | | | |
| | | | | | |
| | | | | | |
| | | | | | |
| | | | | | |
| | | | | | |
| | | | | | |
| | | | | | |
| | | | | | |

FIG. 6B

APPLICATION SHEET FOR CERTIFICATE OF FAMILY REGISTER/IDENTIFICATION PAPER, ETC. (BY MAIL)

PLEASE APPLY TO MUNICIPALITY OF REGISTERED DOMICILE    YEAR/MONTH/DAY

| REQUIRED FAMILY REGISTER | REGISTERED DOMICILE | | |
| --- | --- | --- | --- |
| | HEAD OF FAMILY | | |
| REQUIRED DOCUMENTS | xxxxxxx | xxxxxxx | xxxxxxx |
| | xxxxxxx | xxxxxxx | xxxxxxx |
| | xxxxxxx | xxxxxxx | xxxxxxx |
| | xxxxxxx | xxxxxxx | xxxxxxx |
| | xxxxxxx | xxxxxxx | xxxxxxx |
| APPLICANT | ADDRESS | | |
| | NAME | | xxxxxxx |
| xxxxxxx | xxxxxxx | | |
| PURPOSE | xxxxxxx xxxxxxx xxxxxxx xxxxxxx xxxxxxx xxxxxxx | | |
| xxxxxxx | xxxxxxx | | | xxxxxxx
xxxxxxx
xxxxxxx

FIG. 6C

PRE-DRIVING INSPECTION RECORD SHEET xxxxxxx
xxxxxxx
xxxxxxx

| | | INSPECTION OF CHASSIS | xxxx | xxxx | xxxxx |
| --- | --- | --- | --- | --- | --- |
| xxxxxxx | 1 | xxxxxxx | | ☐ | ☐ |
| | 2 | xxxxxxx | | ☐ | ☐ |
| | 3 | xxxxxxx | | | |
| | 4 | xxxxxxx | | | |
| | 5 | xxxxxxx | | | |
| | 6 | xxxxxxx | | | |
| | 7 | xxxxxxx | | | |
| | 8 | xxxxxxx | | | |
| | | INSPECTION OF ENGINE | xxxx | xxxx | xxxxx |
| xxxxxxx | 9 | xxxxxxx | | ☐ | ☐ |
| | 10 | xxxxxxx | | ☐ | ☐ |
| | 11 | xxxxxxx | | | |
| | 12 | xxxxxxx | | | |
| | | INSPECTION OF BODY | xxxx | xxxx | xxxxx |
| xxxxxxx | 13 | xxxxxxx | | ☐ | ☐ |
| | 14 | xxxxxxx | | ☐ | ☐ |
| | 15 | xxxxxxx | | ☐ | ☐ |
| | 16 | xxxxxxx | | | |
| | 17 | xxxxxxx | | | | xxxxxxx

INFORMATION PROCESSING DEVICE, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2013-222240 filed Oct. 25, 2013.

BACKGROUND

Technical Field

The present invention relates to an information processing device, a non-transitory computer readable medium, and an information processing method.

SUMMARY

According to an aspect of the invention, there is provided an information processing device including a processing-type accepting unit that accepts a type of first processing of data, a data accepting unit that accepts post-processing data, the post-processing data being data on which the first processing accepted by the processing-type accepting unit has been executed, and a data processing unit that determines a data confidentiality level indicating a degree of confidentiality of the post-processing data, on a basis of a first confidentiality level associated with the type of the first processing, and executes second processing according to the data confidentiality level with respect to the post-processing data.

BRIEF DESCRIPTION OF THE DRAWINGS

Exemplary embodiment of the present invention will be described in detail based on the following figures, wherein.

DETAILED DESCRIPTION

<Configuration>

Figure 1:
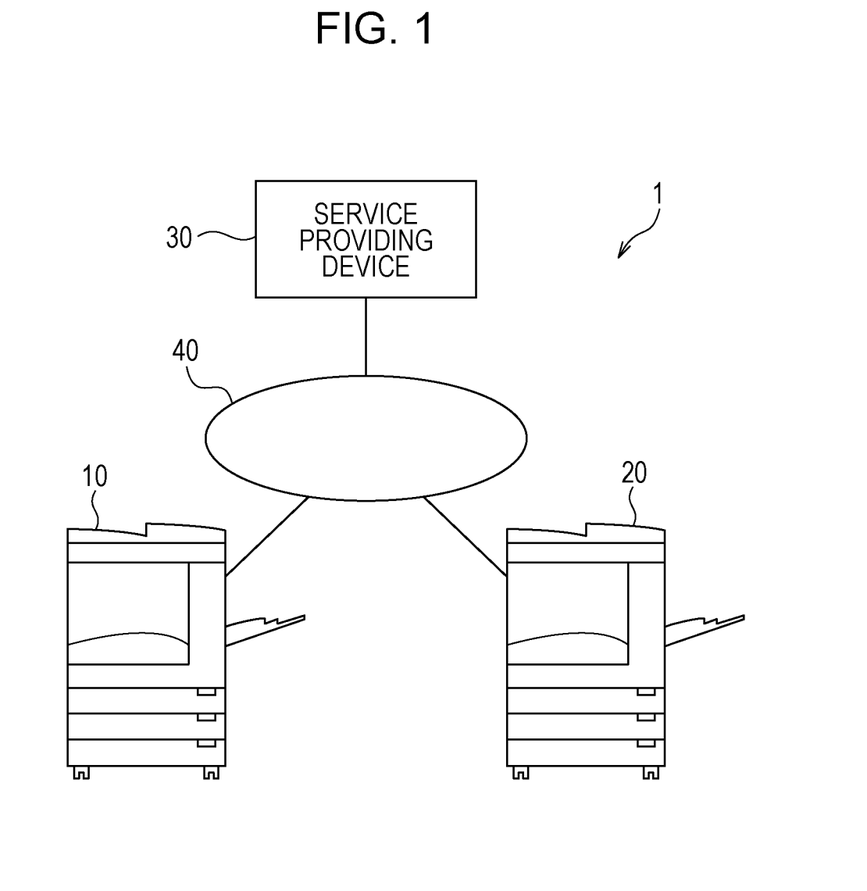
FIG. 1 schematically illustrates an example of the general configuration of a system.

FIG. 1 schematically illustrates a general configuration of a system 1 according to an exemplary embodiment of the invention. The system 1 includes an image forming device 10 (an example of image processing device), an image forming device 20 (an example of second image processing device), and a service providing device 30. The image forming device 10 and the image forming device 20 are, for example, electrophotographic image forming devices. The image forming device 10 and the image forming device 20 include functions such as an image forming function for forming an image on a recording medium such as a sheet of paper, a copy function for copying an image, and a scan function for reading an image formed on a recording medium. Functions included in the image forming device 10 and the image forming device 20 are not limited to these functions. For example, the image forming device 10 and the image forming device 20 may include a facsimile function. Further, the image forming device 10 and the image forming device 20 may not necessarily include all of the functions mentioned above. For example, the image forming device 10 and the image forming device 20 may include the image forming function and the copy function but may not include other functions. The service providing device 30 is a device that provides services that apply some processing to data (hereinafter, referred to as "data processing services"). The data processing services include, for example, a translation service, a service that performs character recognition such as optical character recognition (OCR), image processing (such as binarization, thinning, enlargement/reduction, or inversion), format conversion, and a service that outputs a certificate of residence with an application document as an input. The data processing services also include such services that simply output specified data. The service providing device 30 may be provided in the manner of a so-called cloud service. Alternatively, services may be provided not by a single service providing device 30 but by multiple service providing devices 30. However, for the ease of understanding, the following description assumes that the data processing services are provided by a single service providing device 30. A network 40 is a network such as a local area network (LAN) or a wide area network (WAN). The network 40 is a communication line that connects the image forming device 10, the image forming device 20, and the service providing device 30.

Figure 2:
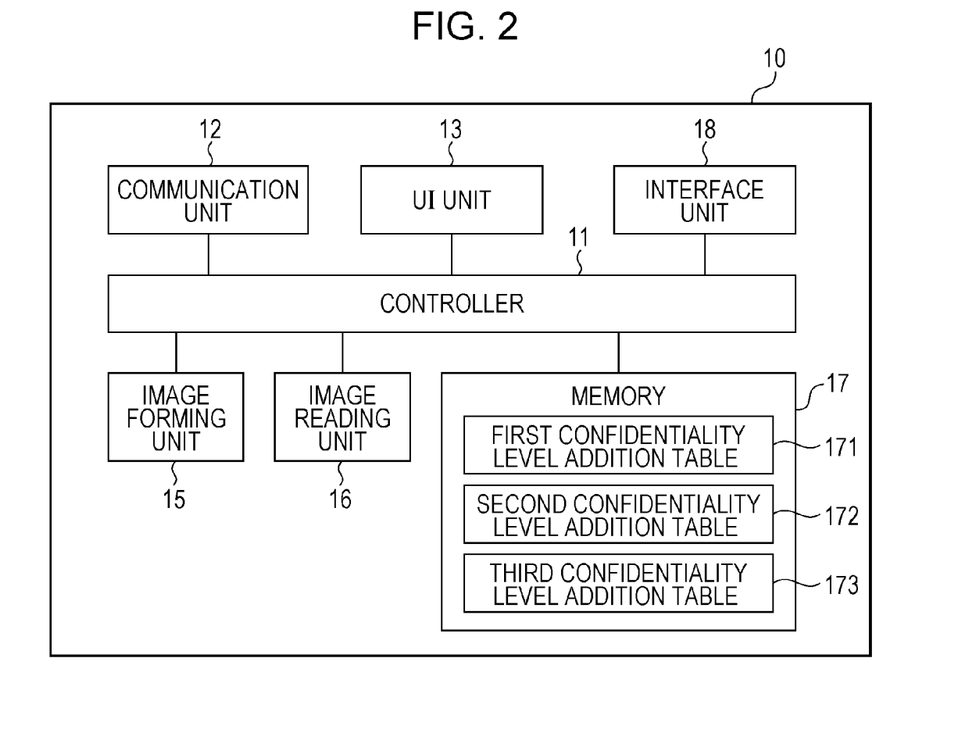
FIG. 2 is a block diagram illustrating an example of the hardware configuration of an image forming device.

FIG. 2 is a block diagram illustrating an example of the hardware configuration of the image forming device 10. In FIG. 2, a controller 11 includes an arithmetic unit such as a central processing unit (CPU), and internal memories such as a read only memory (ROM) and a random access memory (RAM). Programs to be executed by the arithmetic unit are stored in the ROM. The arithmetic unit controls operation of various units of the image forming device 10 by executing programs stored in the ROM and a memory 17 by using the RAM as a work area. A communication unit 12 communicates with the image forming device 20 or the service providing device 30 via the network 40. A UI unit 13 includes operators such as various keys and a touch sensor. The UI unit 13 supplies an operation signal corresponding to a user's operation to the controller 11. The controller 11 executes processing according to this operation signal. In addition, the UI unit 13 includes a liquid crystal panel and a liquid crystal drive circuit, and displays images under control by the controller 11. An image forming unit 15 forms an image on a recording medium such as a sheet of paper by the electrophotographic system. An image reading unit 16 optically reads an image of a document. The memory 17 is, for example, a storage device such as a hard disk, and stores data and programs that are used by the controller 11. The memory 17 stores a first confidentiality level addition table 171 (an example of first memory), a second confidentiality level addition table 172 (an example of second memory), and a third confidentiality level addition table 173 (an example of third memory). Each of the first confidentiality level addition table 171, the second confidentiality level addition table 172, and the third confidentiality level addition table 173 is a table that is referenced when determining a confidentiality level indicating the degree of confidentiality of document data (an example of data confidentiality level) to which information processing has been applied. An interface unit 18 is an interface including a port or the like into which a universal serial bus (USB) device is inserted. The interface unit 18 supplies data supplied from the USB device inserted into the port to the controller 11.

Figure 3:
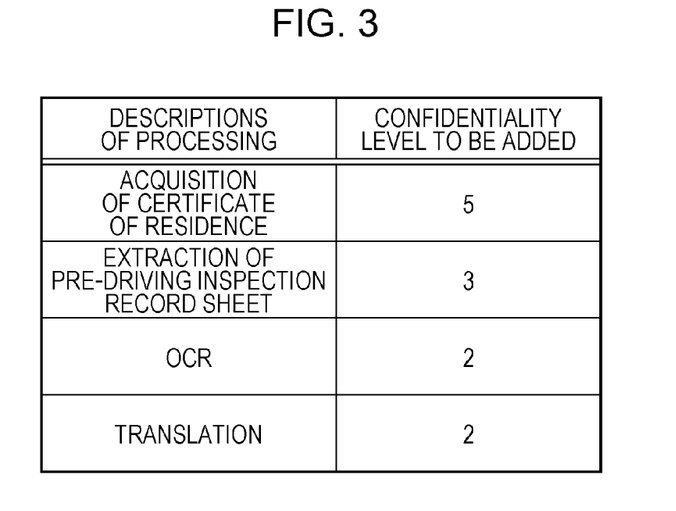
FIG. 3 illustrates an example of the contents of a first confidentiality level addition table.

FIG. 3 illustrates an example of the contents of the first confidentiality level addition table 171. As illustrated in FIG. 3, this table stores "Descriptions of processing" and "Confidentiality level to be added" as items in association with each other. Of these items, the item "Descriptions of processing" stores information for identifying the type of processing such as "Acquisition of certificate of residence", "Extraction of pre-driving inspection record sheet", "OCR", and "Translation". The item "Acquisition of certificate of residence" indicates acquisition of a certificate of residence in which information, such as the name, address, and registered domicile, is written. The item "Extraction of pre-driving inspection record sheet" indicates acquisition of a pre-driving inspection record sheet that is referenced when performing pre-inspection before driving a vehicle or the like. The item "Confidentiality level to be added" stores the value of confidentiality level to be added or subtracted (the degree of increase/decrease of confidentiality level), such as "5" or "3", when various processing is applied to document data. When performing a confidentiality level determination process described later, the controller 11 determines a confidentiality level by referencing the first confidentiality level addition table 171. In the exemplary embodiment, the confidentiality level to be added is set to a large value for processing that is considered to be highly confidential such as "Acquisition of certificate of residence".

Figure 4:
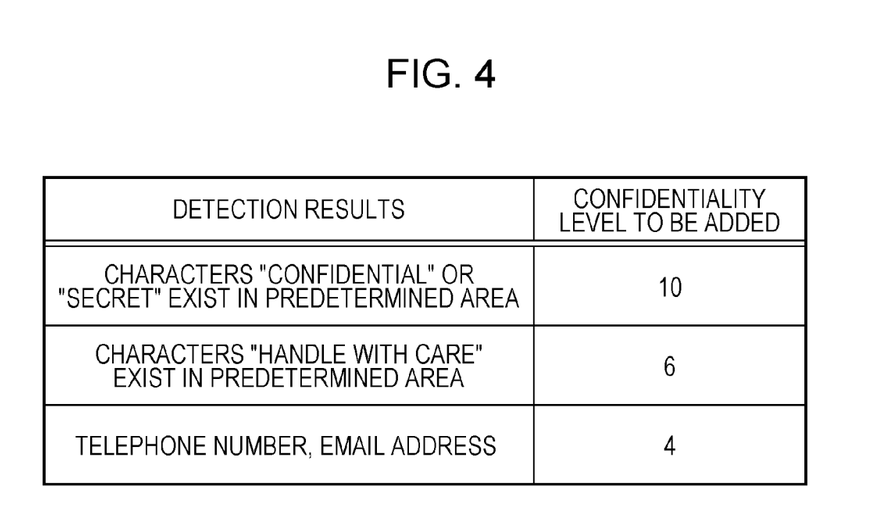
FIG. 4 illustrates an example of the contents of a second confidentiality level addition table.

FIG. 4 illustrates an example of the contents of the second confidentiality level addition table. As illustrated in FIG. 4, this table stores "Detection results" and "Confidentiality level to be added" as items in association with each other. Of these items, the item "Detection results" stores data representing character strings or images (hereinafter, referred to as "classified data") that are determined to be highly confidential when, as a result of a character recognition process applied to data to which processing has been applied (hereinafter, referred to as "post-processing data"), such character strings or images are detected from the post-processing data. The item "Confidentiality level to be added" stores the value to be added or subtracted to the confidentiality level (the degree of increase/decrease of confidentiality level) when each character string is detected. Specifically, for example, in a case where a character recognition process is applied to post-processing data, the controller 11 adds "10" to the confidentiality level when it is determined that characters such as "Confidential" or "Secret" are included in a predetermined area, and the controller 11 adds "6" to the confidentiality level when characters such as "Handle with care" are included in a predetermined area.

Figure 5:
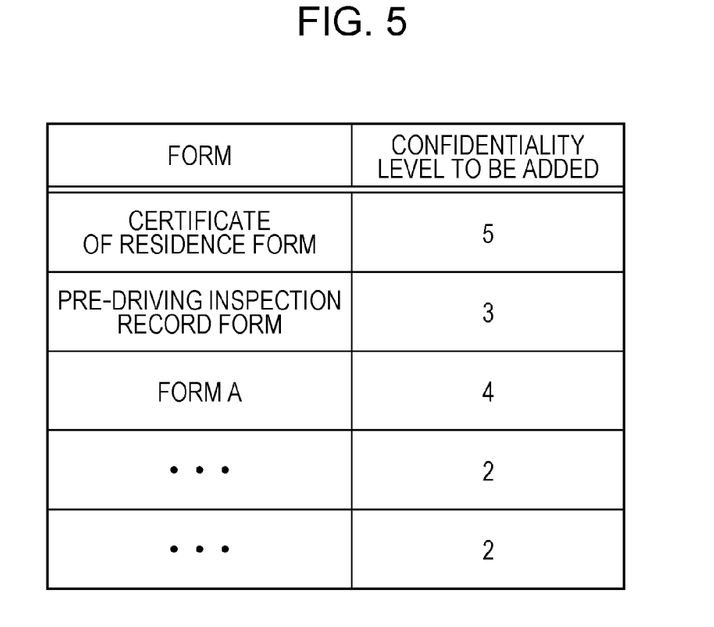
FIG. 5 illustrates an example of the contents of a third confidentiality level addition table.

FIG. 5 illustrates an example of the contents of the third confidentiality level addition table. As illustrated in FIG. 5, this table stores "Form" and "Confidentiality level to be added" as items in association with each other. Of these items, the item "Form" stores information (for example, form name or the like) for identifying data (hereinafter, referred to as "form") indicating the layout/format of at least one of characters, graphics, and images in a document. The item "Confidentiality level to be added" stores a confidentiality level corresponding to each individual form. For example, in a case where the form of document data is "Certificate of residence form", the controller 11 adds "5" to the confidentiality level.

Figure 6A:
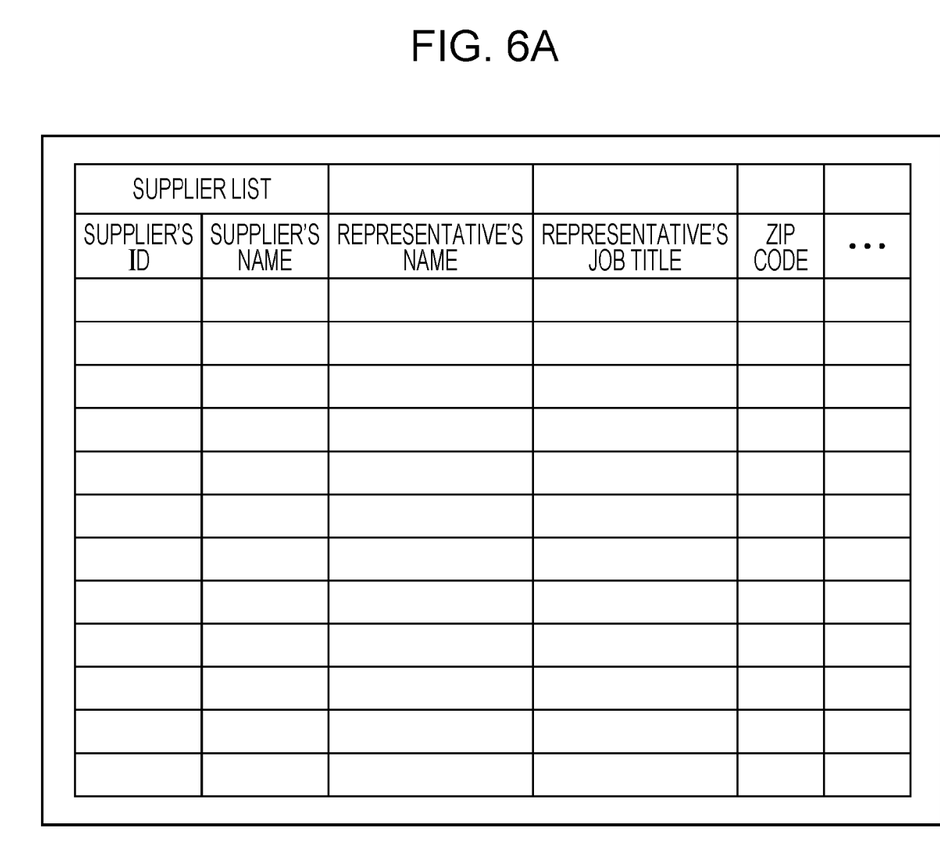
FIGS. 6A to 6C each illustrate an example of the contents of a form.
Figure 6B:
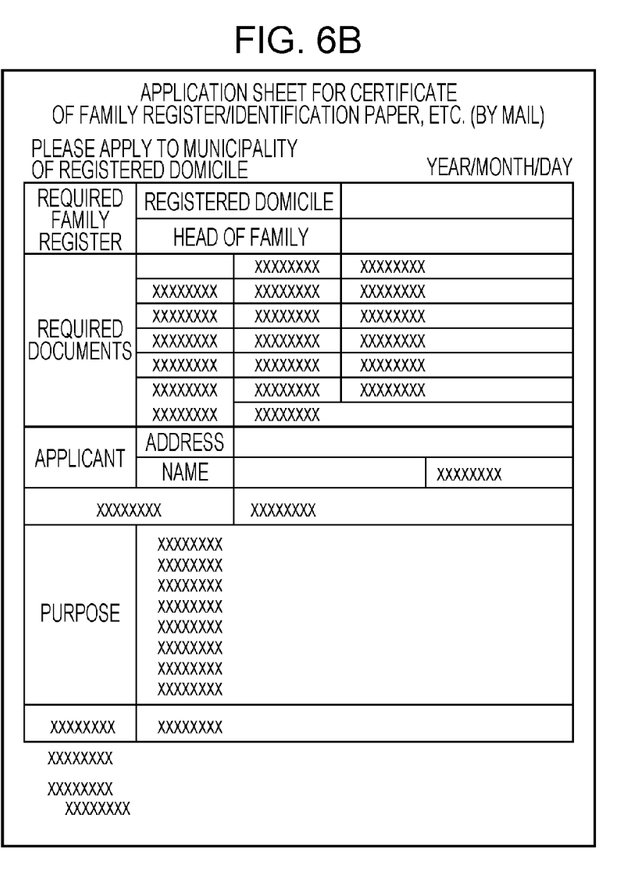
Figure 6C:
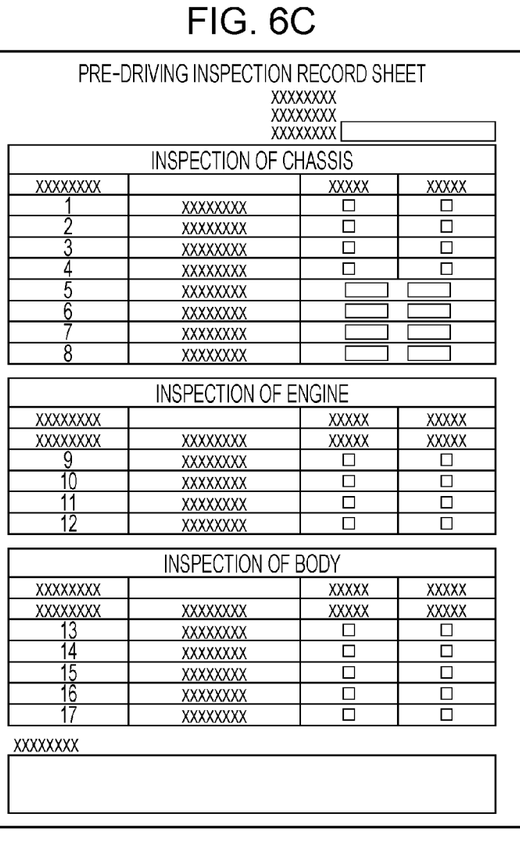

FIGS. 6A, 6B, and 6C each illustrate an example of the contents of a form. As illustrated in FIGS. 6A, 6B, and 6C, in each form, character strings, graphics such as lines, tables, and entry columns, and the like are arranged at predetermined positions. In addition to characters and graphics, each form may include, for example, a logo image representing a company mark. The controller 11 analyzes document data and determines the form of the document data. As a method of determining the form, for example, the form may be determined by the controller 11 by performing image analysis on document data and checking the result against a check pattern representing a predetermined form image. Alternatively, for example, the form may be determined by referencing code information (for example, a QR Code®) or the like embedded in document data. That is, existing techniques may be used to determine the form, and a detailed description of such techniques is omitted here. The controller 11 determines a confidentiality level on the basis of a confidentiality level stored in association with the form determined by the controller 11.

Figure 7:
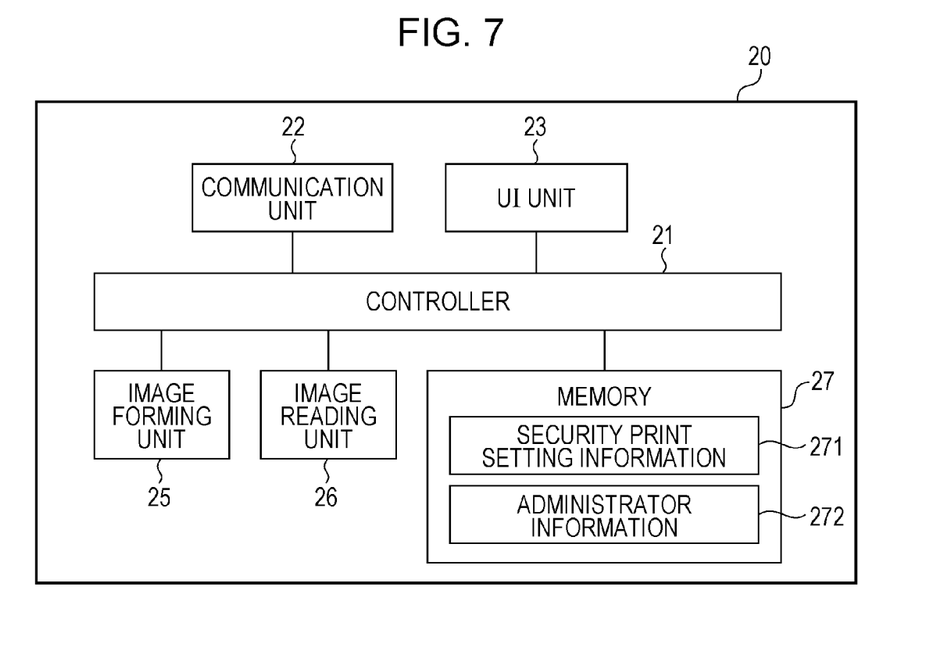
FIG. 7 is a block diagram illustrating an example of the hardware configuration of an image forming device.

Next, a hardware configuration of the image forming device 20 will be described with reference to a figure. FIG. 7 is a block diagram illustrating an example of the hardware configuration of the image forming device 20. In FIG. 7, a controller 21 includes an arithmetic unit such as a CPU, and internal memories such as a ROM and a RAM. Programs to be executed by the arithmetic unit are stored in the ROM. The arithmetic unit controls operation of various units of the image forming device 20 by executing programs stored in the ROM and a memory 27 by using the RAM as a work area. A communication unit 22 communicates with the image forming device 20 or the service providing device 30 via the network 40. A UI unit 23 includes operators such as various keys and a touch sensor. The UI unit 23 supplies an operation signal corresponding to a user's operation to the controller 21. The controller 21 executes processing according to this operation signal. In addition, the UI unit 23 includes a liquid crystal panel and a liquid crystal drive circuit, and displays images under control by the controller 21. An image forming unit 25 forms an image on a recording medium such as a sheet of paper by the electrophotographic system. An image reading unit 26 optically reads an image of a document. The memory 27 is, for example, a storage device such as a hard disk, and stores data and programs that are used by the controller 21.

The memory 27 stores security print setting information 271, and administrator information 272. The security print setting information 271 is setting information indicating the above-mentioned security print, that is, whether or not user authentication is required when outputting document data. In a case where the security print setting information is "ON", the controller 21 operates as follows. That is, when the controller 21 receives, from another device, an instruction to output document data, the controller 21 does not output the received document data but temporarily accumulates the data in a predetermined storage area of the memory 27. In this case, the controller 21 waits until a user operates the UI unit 23 and user authentication is performed, and only after user authentication is performed, the controller 21 then outputs the document data being accumulated. Further, in a case where the security print setting information is "OFF", the controller 21 operates as follows. That is, when the controller 21 receives, from another device, an instruction to output document data, the controller 21 outputs the document data as it is, without waiting for user authentication. The administrator information 272 is information related to an administrator, such as the email address of the administrator and an organization to which the image forming device 20 belongs.

Figure 8:
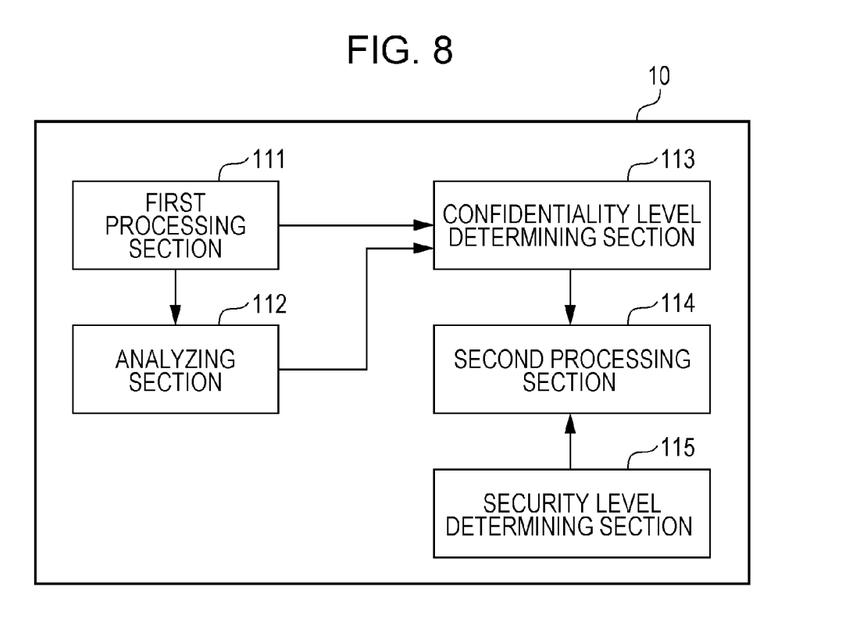
FIG. 8 is a block diagram illustrating an example of the functional configuration of an image forming device.

Next, a functional configuration of the image forming device 10 will be described with reference to a figure. FIG. 8 is a block diagram illustrating a functional configuration of the image forming device 10. In the image forming device 10, a first processing unit 111, an analyzing unit 112, a confidentiality level determining unit 113, a second processing unit 114, and a security level determining unit 115 are realized by the controller 11 or by the controller 11 and the communication unit 12. The first processing unit 111 executes processing (hereinafter, referred to as "first processing") with respect to data. The processing executed by the first processing unit 111 includes processing (data processing services) which an external device (such as the service providing device 30) is requested by the first processing unit 111 to execute. The analyzing unit 112 analyzes post-processing data processed by the first processing unit 111. The confidentiality level determining unit 113 determines a confidentiality level on the basis of the type of the first processing and the results of analysis by the analyzing unit 112. A confidentiality level indicates the degree of confidentiality of post-processing data. The second processing unit 114 executes processing according to the confidentiality level with respect to post-processing data. The security level determining unit 115 determines a security level on the basis of information related to a predetermined information processing device (the image forming device 20 in the exemplary embodiment). A security level indicates the degree of security when outputting post-processing data by an information processing device. In this regard, the second processing unit 114 may determine a confidentiality level and execute processing according to the determined confidentiality level.

<Operation>

Next, operation of the exemplary embodiment will be described.

<Post-Processing Data Accumulation>

First, a description will be given of an operation in which the user operates the image forming device 10 to request the service providing device 30 for processing of document data, and the controller 11 of the image forming device 10 accumulates post-processing data, which is data that has been processed, in association with a determined confidentiality level. More specifically, this operation example is directed to a case where the image forming device 10 is caused to scan a medium such as a sheet of paper, and information processing provided by the service providing device 30 is applied to document data generated by this scan.

Figure 9:
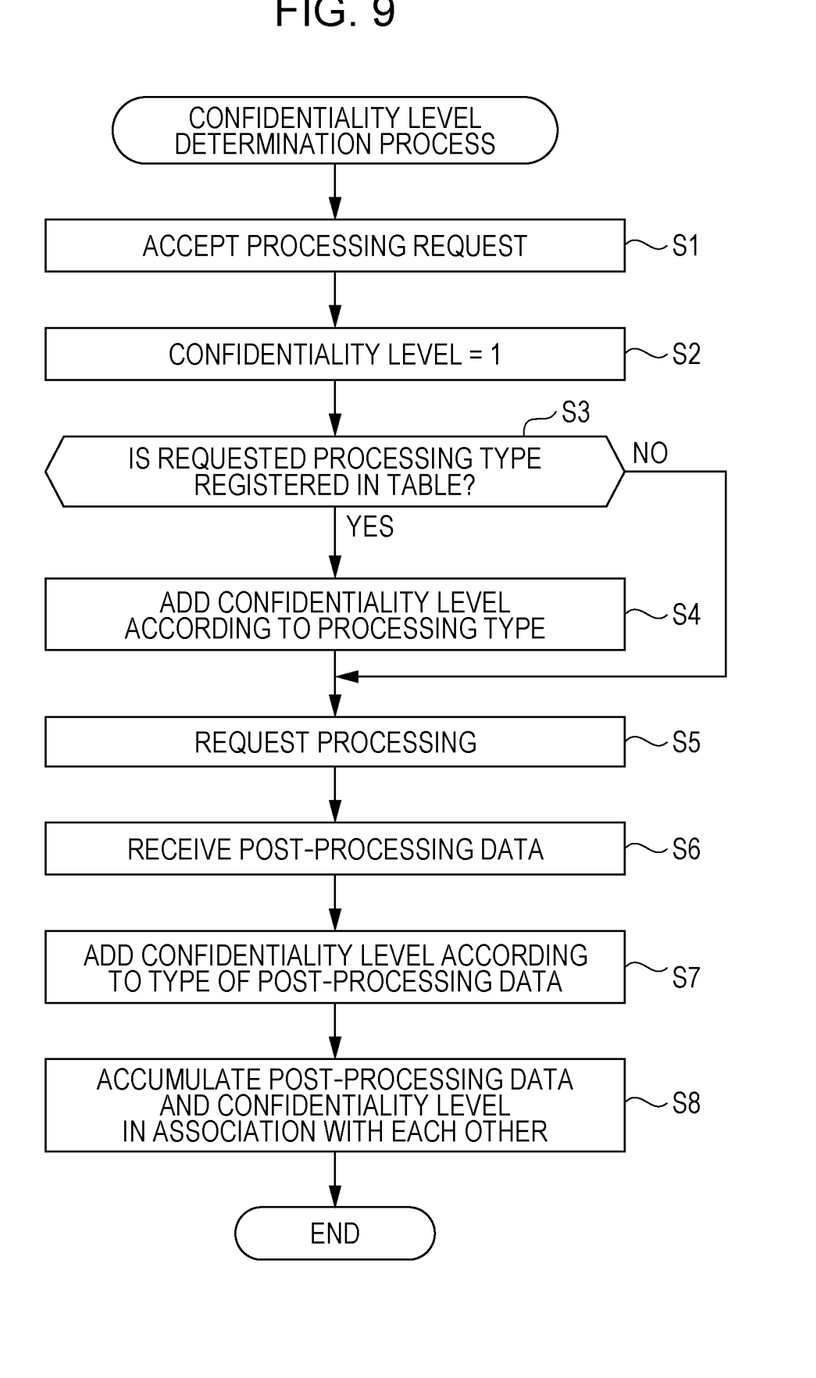
FIG. 9 is a flowchart illustrating a flow of processing executed by an image forming device.

FIG. 9 is a flowchart illustrating a flow of processing executed by the image forming device 10. First, the user places the document (medium) to be scanned in the image reading unit 16, and uses the UI unit 13 of the image forming device 10 to issue an instruction to display a menu screen used for selecting the processing to be executed with respect to document data. On the basis of information outputted from the UI unit 13, the controller 11 displays a menu screen representing a list of processing on the UI unit 13. The user selects a type of processing (an example of first processing) from the menu screen displayed on the UI unit 13, and specifies a device to which to output data. The UI unit 13 outputs information corresponding to the kind of an operation made by the user, and on the basis of information outputted from the UI unit 13, the controller 11 accepts information indicating the type of processing to be applied to document data, and an output device (step S1).

Next, the controller 11 determines the confidentiality level of requested processing by executing step S2 through step S4. First, the controller 11 sets the value of confidentiality level to 1 (step S2). Next, the controller 11 determines whether or not the kind of the processing requested (the type of processing selected by the user) is registered in the first confidentiality level addition table 171 (step S3). In a case where it is determined that the kind of the processing requested is registered, the controller 11 references the first confidentiality level addition table 171, and performs a confidentiality level addition process according to the kind of the processing (step S4). In a case where the contents of the first confidentiality level addition table 171 are as illustrated in FIG. 3, for example, the following processing is performed. That is, for acquisition of a certificate of residence, "5" is added to the confidentiality level, and for translation, "2" is added to the confidentiality level. In a case where it is determined in step S3 that the kind of the processing requested is not registered, the controller 11 skips step S4 and proceeds to step S5. Alternatively, the controller 11 may be configured to determine the form of the document data to be processed, determine the kind of processing to be performed the basis of the determination result, and perform a confidentiality level addition process according to the determined kind of processing. For example, in a case where the form of document data is the form of an application for a certificate of residence, the controller 11 may add "5" to the confidentiality level.

In step S5, the controller 11 transmits the document data to the service providing device 30, and requests the service providing device 30 to execute processing (step S5). The service providing device 30 executes the requested processing on the basis of data received from the image forming device 10. This processing may require a long time, for example, one hour or two hours. That is, it may take some time for step S5 to be started after step S4 ends.

When the service providing device 30 completes the requested processing, and transmits the processing result to the image forming device 10, the image forming device 10 receives post-processing data, which is data that has been processed, from the service providing device 30 (step S6). The controller 11 of the image forming device 10 performs processing such as image analysis and character recognition on the received post-processing data, and on the basis of the processing result, the second confidentiality level addition table 172, and the third confidentiality level addition table 173, the controller 11 performs a confidentiality level addition process according to the kind of the post-processing data (step S7). In the exemplary embodiment, the controller 11 applies a character recognition process such as OCR to the post-processing data transmitted from the service providing device 30, and performs a confidentiality level addition process on the basis of information such as whether or not a predetermined character string (for example, "Secret" or "Confidential") is included in a specific area or whether or not an email address or a telephone number is included. The determination of whether or not an email address is included may be performed by, for example, determining whether or not a character string including "@ mark" or "." is included. Further, the determination of whether or not a telephone number is included may be performed by, for example, determining whether or not a numeric string with a predetermined number of digits is included. In a case where the contents of the second confidentiality level addition table 172 are as illustrated in FIG. 4, for example, "4" is added to the confidentiality level in a case where it is determined that a telephone number is detected by a character recognition process.

Specifically, in a case where the processing applied to document data is processing that is classified into "Acquisition of certificate of residence", "5" is added to the confidentiality level in step S4, and in a case where it is determined that a telephone number is included as a result of a character recognition process applied to post-processing data, "4" is added to the confidentiality level in step S7. Therefore, as a result of these additions, the confidentiality level of the post-processing data becomes "10". An upper limit may be set to the confidentiality level such that in a case where the addition result exceeds the maximum value (11) of security level described later, the confidentiality is set to "11".

Upon finishing step S7, the controller 11 creates a list in which the post-processing data and the confidentiality level are associated with each other, and stores the list into a predetermined storage area of the memory 17 together with the post-processing data (step S8).

<List Acquisition>

Next, operation for a case where the image forming device 10 has received an acquisition request for a list of post-processing data from the image forming device 20 will be described with reference to figures.

Figure 10:
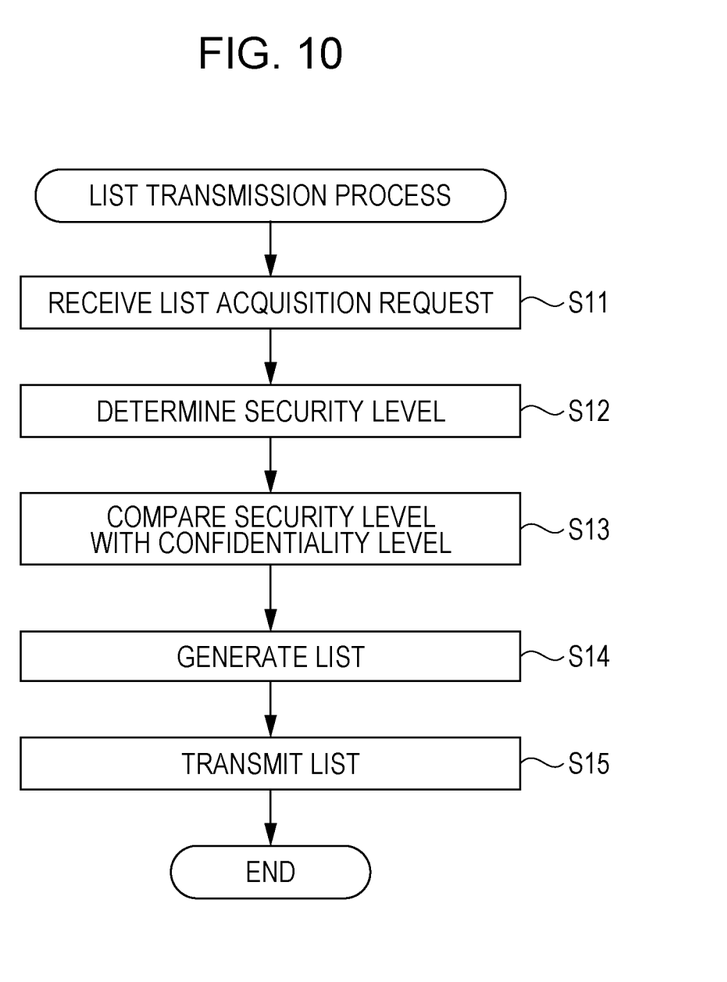
FIG. 10 is a flowchart illustrating a flow of processing executed by an image forming device.

FIG. 10 is a flowchart illustrating a flow of processing executed by the image forming device 10. First, the user uses the UI unit 23 of the image forming device 20 to transmit an acquisition request for a list of post-processing data that may be outputted. When the image forming device 10 receives the list acquisition request from the image forming device 20 (step S11), first, the image forming device 10 determines the security level with respect to output of post-processing data of the image forming device 20 (a device to which to output data (hereinafter, referred to as "destination device")) (step S12).

Figure 11:
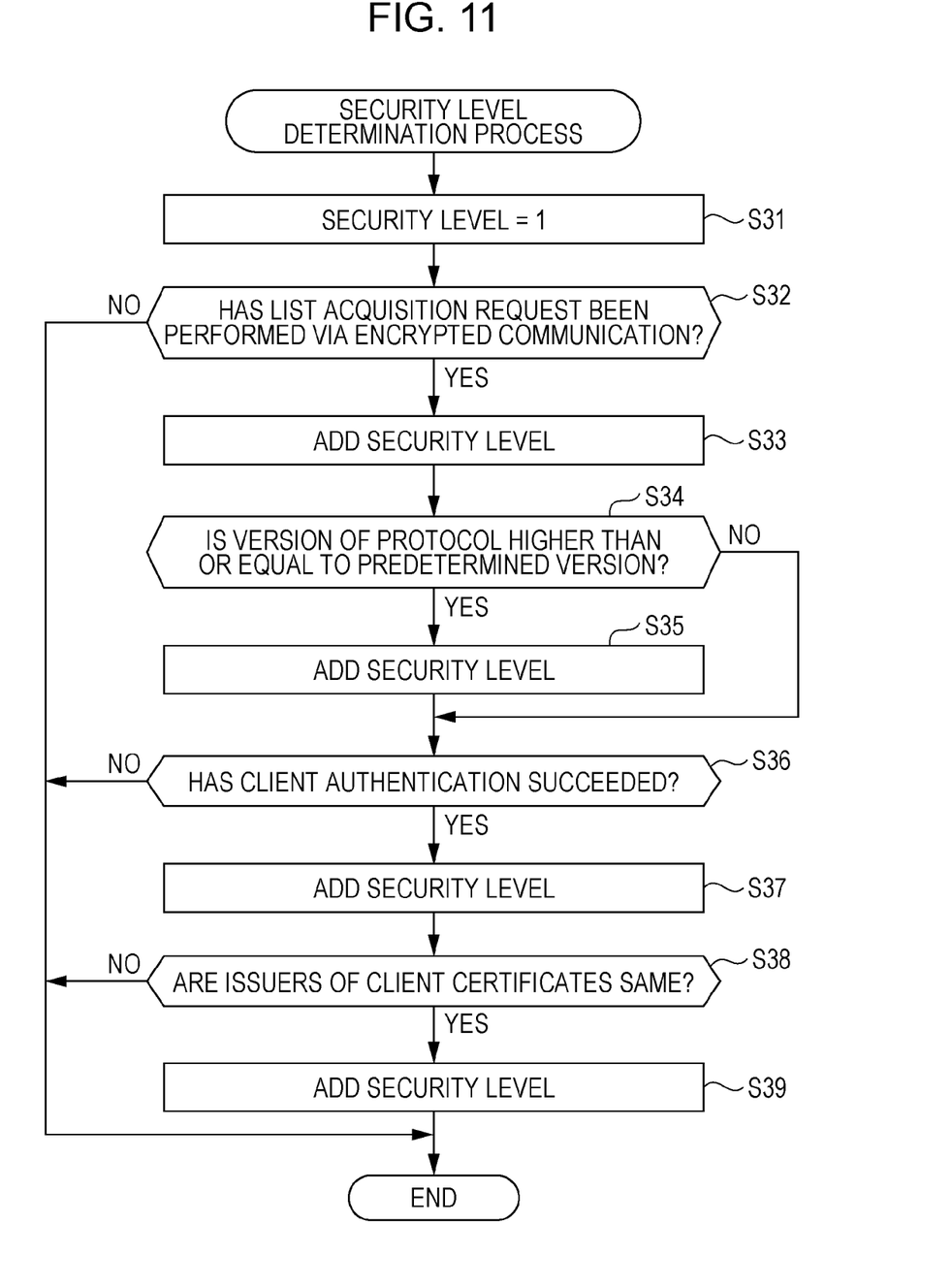
FIG. 11 is a flowchart illustrating a flow of a security level determination process executed by an image forming device.

FIG. 11 is a flowchart illustrating a flow of the process in step S12 illustrated in FIG. 10, that is, a security level determination process executed by the controller 11. In the exemplary embodiment, the controller 11 determines a security level by using information related to the communication path used in the transmission process of the list acquisition request transmitted from the image forming device 20. Specifically, first, the controller 11 sets the value of security level to 1 (step S31). Next, the controller 11 determines whether or not the transmission of the list acquisition request from the image forming device 20 has been performed via protocol (for example, Security Socket Layer (SSL)) communication that encrypts information in transmitting/receiving information (hereinafter, referred to as "encrypted communication") (step S32). In a case where it is determined that the transmission has been performed via encrypted communication (step S32; YES), the controller 11 adds a predetermined value (for example, "2") to the security level (step S33), and determines whether or not the version of the encrypted communication protocol used is higher than or equal to a predetermined version (step S34). In a case where it is determined that the version is higher than or equal to a predetermined version (step S34; YES), the controller 11 adds a predetermined value (for example, "2") to the security level (step S35). By step S32 through step S35, it is determined whether or not the list acquisition request has been performed via encrypted communication, and also calculation of the security level according to the version of the encrypted communication is performed.

Next, the controller 11 performs client authentication that requests the image forming device 20 to present an electronic certificate in encrypted communication, and in a case where the client authentication succeeds (step S36; YES), the controller 11 adds a security level (step S37). In a case where the client authentication does not succeed (step S36; NO), the controller 11 skips step S37 through step S39 and ends the processing. In step S38, the controller 11 verifies a client certificate, and determines whether or not the domain of the subject of the client certificate of the image forming device 20 is the same as that of the certificate of the image forming device 10 (step S38). In a case where the two certificates are determined to be the same (step S38; YES), the controller 11 adds a security level (step S39). In a case where the two certificates are not determined to be the same (step S38; NO), the controller 11 skips step S39 and ends the security level determination process. Further, in a case where it is not determined in step S32 that the list acquisition request has been performed via encrypted communication (step S32; NO), the controller 11 skips step S33 through step S39 and ends the processing. As a result of the processing mentioned above, the higher the security of the communication used in transmitting the list acquisition request, the higher the value set for the security level.

Figure 12:
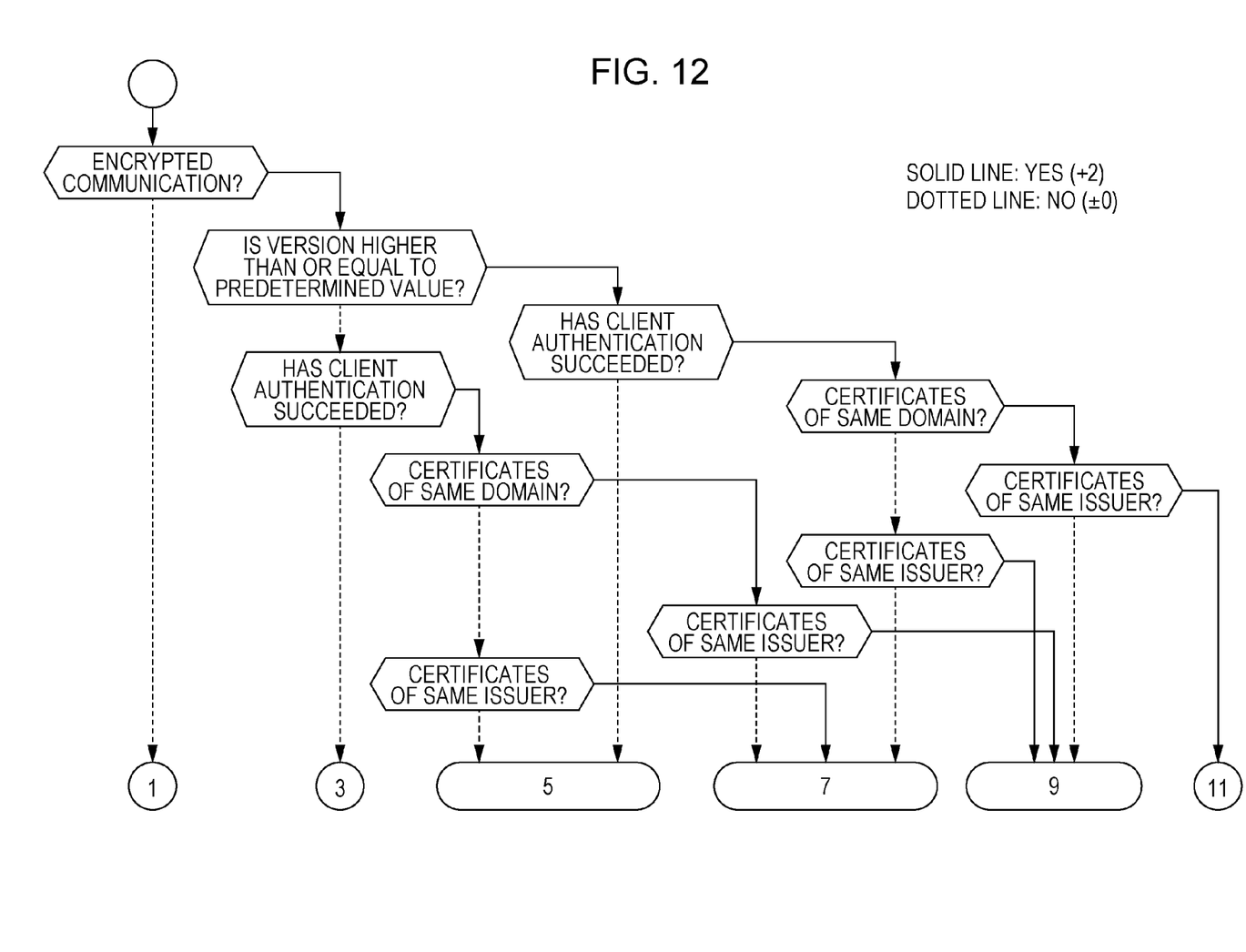
FIG. 12 illustrates a specific example of the results of confidentiality level determination.

FIG. 12 illustrates a specific example of values of security level computed by the processing illustrated in FIG. 11. In a case where "2" is added to the security level in step S33, step S35, step S37, and step S39 illustrated in FIG. 11, the finial value of security level reaches the right end of FIG. 12. That is, for example, the value of security level becomes "1" in a case where encrypted communication is not used, and the value of security level becomes "5" in a case where client authentication has failed even though a version of encrypted communication higher than or equal to a predetermined version is used.

Now, the description returns to FIG. 10. Next, the controller 11 compares the confidentiality level of each individual piece of post-processing data being accumulated, with the security level determined in step S12, and determines whether or not to allow output of the post-processing data to the image forming device 20 (step S13). Specifically, for example, the controller 11 may determine to allow output of post-processing data in a case where the value of security level is higher than or equal to the value of confidentiality level. The controller 11 generates a list of post-processing data determined as allowed to be outputted (step S14), and transmits the generated list to the image forming device 20 that is a destination device (step S15). The image forming device 20 receives the list transmitted from the image forming device 10, and displays the received list on the UI unit 23. The user checks the screen displayed on the UI unit 23 to recognize post-processing data that may be outputted to the image forming device 20, and as necessary, instructs the post-processing data to be outputted by using the UI unit 23. As for post-processing data determined as not allowed to be outputted in step S13, the controller 11 displays an error to that effect on the UI unit 23.

<Modifications>

The exemplary embodiment mentioned above is only an example, and may be modified as follows. Further, the modifications mentioned below may be combined with each other.

(1) In the exemplary embodiment mentioned above, the controller 11 may change information stored in the first confidentiality level addition table 171. In this case, the controller 11 functions as an instruction accepting unit that accepts an instruction causing the type of processing and the degree of increase/decrease of confidentiality level to be registered into the first confidentiality level addition table 171 in association with each other, and an updating unit that updates information stored in the first confidentiality level addition table 171 on the basis of the accepted instruction. Specifically, for example, the user issues an instruction for storing the type of processing and the confidentiality level in association with each other by using the UI unit 13 of the image forming device 10, and the controller 11 updates information stored in the first confidentiality level addition table 171 on the basis of information outputted from the UI unit 13.

In the exemplary embodiment mentioned above, the controller 11 may change information stored in the second confidentiality level addition table 172. In this case, the controller 11 functions as an instruction accepting unit that accepts an instruction causing classified data and the degree of increase/decrease of confidentiality level to be registered into the second confidentiality level addition table 172 in association with each other, and an updating unit that updates information stored in the second confidentiality level addition table 172 on the basis of the accepted instruction.

In the exemplary embodiment mentioned above, the controller 11 may change information stored in the third confidentiality level addition table 173. In this case, the controller 11 functions as an instruction accepting unit that accepts an instruction causing the form and the degree of increase/decrease of confidentiality level to be registered into the third confidentiality level addition table 173 in association with each other, and an updating unit that updates information stored in the third confidentiality level addition table 173 on the basis of the accepted instruction.

(2) In the exemplary embodiment mentioned above, a predetermined character string (such as "Secret" or "Confidential") is extracted from post-processing data in step S7 in FIG. 9. However, the information to be extracted is not limited to a character string but an image may be extracted. For example, in step S7, the controller 11 may analyze the image of the front cover of a document represented by post-processing data, and extract a specific image indicating high confidentiality by a technique such as pattern matching.

In the exemplary embodiment mentioned above, when the UI unit 23 of the image forming device 20 is operated by the user, the image forming device 20 transmits an acquisition request for a list of post-processing data to the image forming device 10, and the image forming device 10 that has received the list acquisition request transmits the list of post-processing data, or post-processing data to the image forming device 20. However, the trigger that causes the image forming device 10 to transmit post-processing data to the image forming device 20 is not limited to that described above with reference to the exemplary embodiment. For example, the image forming device 10 may transmit a list of post-processing data or the like to the image forming device 20 at predetermined time intervals, irrespective of whether or not the image forming device 10 has received an acquisition request from the image forming device 20.

(3) In the exemplary embodiment mentioned above, as illustrated in FIG. 11, the controller 11 determines a security level by using information related to the communication path between the image forming device 10 and the image forming device 20. However, the technique for determining a security level is not limited to that mentioned above. For example, the controller 11 may determine a security level on the basis of setting information related to output of the image forming device 20, administrator information about the image forming device 20 such as the administrator of the image forming device 20 or an organization to which the image forming device 20 belongs, or positional information related to the installation position of the image forming device 20. In a case where positional information or administrator information about the image forming device 20 is used to determine a security level, for example, the controller 11 may inquire the image forming device 20 for positional information or administrator information when outputting document data, acquire the positional information or administrator information from the image forming device 20, and determine a security level on the basis of the acquired information.

(4) In the exemplary embodiment mentioned above, the document data to be processed is inputted by causing the image reading unit 16 of the image forming device 10 to scan a medium such as a sheet of paper on which an image has been formed. However, the document data to be processed is not limited to data read by the image reading unit 16 but may be another data. For example, the document data to be processed may be determined by specifying document data stored in a predetermined storage area (such as the memory 17 or a memory in the service providing device 30). Further, the data to be processed may be inputted to the image forming device 10 from a USB device or a network.

(5) In the exemplary embodiment mentioned above, the controller 11 of the image forming device 10 requests the service providing device 30 to execute processing designated by the user. However, the controller 11 may execute processing designated by the user. In this case, as in the exemplary embodiment mentioned above, a confidentiality level is determined on the basis of the type of processing designated by the user.

(6) In the exemplary embodiment mentioned above, the controller 11 of the image forming device 10 limits output of a list of image data on the basis of whether the confidentiality level of image data is greater or less than the security level of the image forming device 20. However, the processing to be varied in accordance with the confidentiality level is not limited to the processing described above with reference to the exemplary embodiment mentioned above. For example, the controller 11 may determine whether or not to transmit (output) image data to a predetermined storage server on the basis of a confidentiality level that has been determined. Alternatively, for example, the controller 11 may vary the encryption process applied to post-processing data in accordance with the confidentiality level. In short, it suffices that the controller 11 executes processing according to the confidentiality level with respect to image data.

In the exemplary embodiment mentioned above, the controller 11 determines the confidentiality level of post-processing data that is image data to which processing has been applied. However, post-processing data is not limited to image data. For example, post-processing data may be data other than image data, such as text data or audio data.

(7) In step S7 in FIG. 9 according to the exemplary embodiment mentioned above, the controller 11 may determine the form of post-processing data by performing a pattern matching process on the post-processing data, determine a confidentiality level according to the determined form by using the third confidentiality level addition table 173, and further add the determined confidentiality level. For example, in a case where the contents of the third confidentiality level addition table 173 are as illustrated in FIG. 5, "4" is added to the confidentiality level if the determined form is "Form A". In a case where, as a result of a pattern matching process, there is no match with a predetermined form, and the form is not determined as a result, addition of a confidentiality level is not performed. In step S7, the form may be determined by employing another technique without performing pattern matching, such as on the basis of code information embedded in post-processing data.

The above-mentioned process of determining the form of post-processing data may be performed only in a case where the determination result in step S3 in FIG. 9 is "NO", that is, only in a case where the kind of processing requested by the user is not registered in the first confidentiality level addition table 171.

(8) A program to be executed by each of the image forming device 10 and the image forming device 20 may be downloaded via a communication line such as the Internet. This program may be provided while being recorded on a computer readable recording medium such as a magnetic recording medium (such as a magnetic tape or a magnetic disk), an optical recording medium (such as an optical disc), a magneto-optical recording medium, or a semiconductor memory.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
a processing-type receiving unit that receives a request for a type of first processing of data;
a data receiving unit that receives post-processing data, the post-processing data being data on which the type of the first processing has been executed; and
a data processing unit that determines a data confidentiality level indicating a degree of confidentiality of the post-processing data, on a basis of a type of the post-processing data and a content of the post-processing data, and executes second processing according to the data confidentiality level with respect to the post-processing data,
wherein the type of the post-processing data is determined on a basis of the type of the first processing.

2. The information processing device according to claim 1, wherein the content of the post-processing data is determined by analyzing the post-processing data.

3. The information processing device according to claim 2, further comprising:
a form determining unit that determines a form of the post-processing data,
wherein the type of the post-processing data is further determined on a basis of the form of the post-processing data.

4. The information processing device according to claim 1, wherein the second processing comprises performing encryption of the post-processing data on a basis of the data confidentiality level.

5. The information processing device according to claim 3, wherein the second processing comprises performing encryption of the post-processing data on a basis of the data confidentiality level.

6. The information processing device according to claim 1, further comprising:
a security level determining unit that determines a security level on a basis of information related to a second information processing device, the security level indicating a degree of security when the post-processing data is transmitted to the second information processing device,
wherein the second processing comprises executing processing with respect to the post-processing data on a basis of the data confidentiality level and the security level.

7. The information processing device according to claim 6, wherein the data processing unit determines whether or not to allow output of the post-processing data to the second information processing device, on a basis of the data confidentiality level and the security level.

8. The information processing device according to claim 7, wherein the security level determining unit determines the security level on a basis of at least one of setting information related to an output of the second information processing device, information related to an administrator of the second information processing device, positional information indicating an installation position of the second information processing device, and information related to a communication path between the information processing device and the second information processing device.

9. The information processing device according to claim 1, further comprising:
a first memory that stores information of the first processing received by the processing-type receiving unit, and a first confidentiality level associated with the type of first processing, the information of the first processing being associated with the first confidentiality level; and
a first updating unit that updates information stored in the first memory.

10. The information processing device according to claim 2, further comprising:
a second memory that stores an analysis result obtained by analyzing the post-processing data, and a second confidentiality level associated with the content of the post-processing data, the analysis result being associated with the second confidentiality level; and
a second updating unit that updates information stored in the second memory.

11. The information processing device according to claim 3, further comprising:
a third memory that stores the form determined by the form determining unit, and a third confidentiality level associated with the form of the post-processing data, the form being associated with the third confidentiality level; and
a third updating unit that updates information stored in the third memory.

12. A non-transitory computer readable medium storing a program causing a computer to execute a process, the process comprising:
receiving a request for a type of first processing of data;
receiving post-processing data, the post-processing data being data on which the type of the first processing has been executed; and
determining a data confidentiality level indicating a degree of confidentiality of the post-processing data, on a basis of a type of the post-processing data and a content of the post-processing data, and executing second processing according to the data confidentiality level with respect to the post-processing data,
wherein the type of the post-processing data is determined on a basis of the type of the first processing.

13. An information processing method comprising:
receiving, by at least one processor, a request for a type of first processing of data;
receiving, by a transceiver, post-processing data, the post-processing data being data on which the type of the first processing has been executed; and
determining, by the at least one processor, a data confidentiality level indicating a degree of confidentiality of the post-processing data, on a basis of a type of the post-processing data and a content of the post-processing data, and executing second processing according to the data confidentiality level with respect to the post-processing data,
wherein the type of the post-processing data is determined on a basis of the type of the first processing.

14. The non-transitory computer readable medium according to claim 12, wherein the content of the post-processing data is determined by analyzing the post-processing data.

15. The non-transitory computer readable medium according to claim 14, wherein the process further comprises determining a form of the post-processing data, and
wherein the type of the post-processing data is further determined on a basis of the form of the post-processing data.

16. The information processing method according to claim 13, wherein the content of the post-processing data is determined by analyzing the post-processing data.

17. The information processing method according to claim 14, wherein the method further comprises determining a form of the post-processing data, and
wherein the type of the post-processing data is further determined on a basis of the form of the post-processing data.

* * * * *